US009931807B2

(12) United States Patent
Stewart

(10) Patent No.: US 9,931,807 B2
(45) Date of Patent: Apr. 3, 2018

(54) FLEXIBLE COMPACTOR WITH REINFORCING SPINE

(71) Applicant: The Boeing Company, Chicago, IL (US)

(72) Inventor: Samuel Ray Stewart, Redmond, WA (US)

(73) Assignee: THE BOEING COMPANY, Chicago, IL (US)

( * ) Notice: Subject to any disclaimer, the term of this patent is extended or adjusted under 35 U.S.C. 154(b) by 1168 days.

(21) Appl. No.: 13/968,957

(22) Filed: Aug. 16, 2013

(65) Prior Publication Data
US 2013/0333830 A1 Dec. 19, 2013

Related U.S. Application Data

(63) Continuation-in-part of application No. 13/205,226, filed on Aug. 8, 2011, now Pat. No. 8,997,642.

(51) Int. Cl.
B30B 15/00 (2006.01)
B32B 1/04 (2006.01)
B29C 70/44 (2006.01)
B30B 15/02 (2006.01)
B29C 70/38 (2006.01)
B29C 70/34 (2006.01)
B29D 99/00 (2010.01)

(52) U.S. Cl.
CPC .............. B32B 1/04 (2013.01); B29C 70/342 (2013.01); B29C 70/38 (2013.01); B29C 70/44 (2013.01); B29D 99/001 (2013.01); B30B 15/024 (2013.01); Y10T 156/17 (2015.01)

(58) Field of Classification Search
CPC ......... B30B 9/22; B30B 9/225; B29C 70/342; B29C 70/44; B29C 33/50; B29C 70/38; B29D 99/001; B29D 24/00; B32B 1/04; Y10T 156/17; B64C 1/00
USPC ................................... 100/295, 296
See application file for complete search history.

(56) References Cited

U.S. PATENT DOCUMENTS 2,666,951 A   1/1954  Grove et al.
2,816,593 A   12/1957 Hein
2,986,194 A   5/1961  De Marco
2,995,177 A * 8/1961  Tolonen ............... B29D 30/52
                                                100/211

(Continued)

FOREIGN PATENT DOCUMENTS

CN    102015261 A    4/2011
CN    102431182 A    5/2012

(Continued)

OTHER PUBLICATIONS

State Intellectual Property Office of PRC Notification of First Office Action and English Translation, dated Nov. 30, 2016, regarding Application No. 201480022123.3, 19 pages.

(Continued)

Primary Examiner — Jimmy T Nguyen
(74) Attorney, Agent, or Firm — Yee & Associates, P.C.

(57) ABSTRACT

A device for compacting a contoured elongate composite layup includes flexible first and second fiber reinforced resin flexible sections flexible along their lengths. The first section is flexible within a first plane and the second section is flexible within the first plane as well as within a second plane. The second section includes flexible joints reinforced by a spine.

20 Claims, 17 Drawing Sheets

(56) References Cited

U.S. PATENT DOCUMENTS

| | | | |
|---|---|---|---|
| 3,285,794 A * | 11/1966 | Ritchey | B29C 43/3642 100/211 |
| 4,086,378 A | 4/1978 | Kam et al. | |
| 4,185,069 A | 1/1980 | Smith et al. | |
| 4,187,776 A * | 2/1980 | Schroder | B29C 43/34 100/211 |
| 4,712,472 A * | 12/1987 | Meisen | D06B 15/02 100/170 |
| 4,790,898 A | 12/1988 | Woods | |
| 4,861,406 A | 8/1989 | Baker et al. | |
| 4,875,962 A | 10/1989 | Breakspear | |
| 5,214,951 A | 6/1993 | Waddell | |
| 5,676,080 A | 10/1997 | Allen | |
| 5,700,347 A | 12/1997 | McCowin | |
| 6,045,651 A | 4/2000 | Kline et al. | |
| 6,649,006 B2 | 11/2003 | Benson et al. | |
| 6,814,916 B2 | 11/2004 | Willden et al. | |
| 7,137,182 B2 | 11/2006 | Nelson | |
| 7,513,769 B2 | 4/2009 | Benson et al. | |
| 7,644,491 B2 | 1/2010 | Absalonson | |
| 7,788,784 B2 | 9/2010 | Absalonson et al. | |
| 7,814,644 B2 | 10/2010 | Harrison | |
| 8,663,626 B2 | 3/2014 | Duqueine et al. | |
| 2002/0056788 A1 | 5/2002 | Anderson | |
| 2003/0068472 A1 | 4/2003 | Benson et al. | |
| 2006/0231981 A1 | 10/2006 | Lee et al. | |
| 2006/0249626 A1 | 11/2006 | Simpson et al. | |
| 2008/0111024 A1 | 5/2008 | Lee et al. | |
| 2008/0290214 A1 | 11/2008 | Guzman et al. | |
| 2009/0000726 A1 | 1/2009 | McCowin et al. | |
| 2009/0008825 A1 | 1/2009 | Eberth et al. | |
| 2012/0121866 A1 | 5/2012 | Hawkins et al. | |
| 2013/0036922 A1 | 2/2013 | Stewart et al. | |
| 2014/0314996 A1 | 10/2014 | Stewart | |
| 2015/0197065 A1 | 7/2015 | Stewart et al. | |
| 2016/0176495 A1 | 6/2016 | Stewart | |

FOREIGN PATENT DOCUMENTS

| | | |
|---|---|---|
| JP | 2008535709 A | 9/2008 |
| JP | 2009508711 A | 3/2009 |
| WO | WO2007001447 A2 | 1/2007 |
| WO | 2007039085 A1 | 4/2007 |
| WO | 2008003721 A1 | 1/2008 |
| WO | WO2008003733 A1 | 1/2008 |
| WO | WO2008003767 A1 | 1/2008 |
| WO | 2011032865 A1 | 3/2011 |
| WO | WO2013022534 A2 | 2/2013 |

OTHER PUBLICATIONS

PCT Search Report dated Feb. 7, 2013, regarding Application No. PCT/US2012/045674, filed Jul. 6, 2012, applicant reference 11-0040-PCT, applicant The Boeing Company, 10 pages.

Stewart, "Compacting Uncured Composite Members on Contoured Mandrel Surfaces," U.S. Appl. No. 13/904,224, filed May 29, 2013, 41 pages.

Office Action, dated May 8, 2014, regarding U.S. Appl. No. 13/205,226, 13 pages.

Final Office Action, dated Nov. 5, 2014, regarding U.S. Appl. No. 13/205,226, 7 pages.

Notice of Allowance, dated Dec. 1, 2014, regarding U.S. Appl. No. 13/205,226, 10 pages.

Office Action, dated Mar. 3, 2015, regarding U.S. Appl. No. 13/904,224, 23 pages.

Canadian Intellectual Property Office Examination Search Report, dated Mar. 12, 2015, regarding Application No. 2,835,892, 4 pages.

Notice of Reasons for Rejection and English Translation, dated Jul. 12, 2016, regarding Japanese Patent Application No. 2014-525020, 9 pages.

Notice of Allowance, dated Oct. 23, 2015, regarding U.S. Appl. No. 13/904,224, 12 pages.

State Intellectual Property Office of PRC Notification of First Office Action and English Translation, dated Jun. 26, 2015, regarding Application No. 201280038782.7, 16 pages.

Office Action, dated Jul. 23, 2015, regarding U.S. Appl. No. 13/904,224, 12 pages.

International Search Report and Written Opinion, dated Aug. 7, 2014, reagarding Application No. PCT/US2014-031621, 10 pages.

European Patent Office Examination Report, dated May 11, 2017, regarding Application No. 14721157.7, 4 pages.

State Intellectual Property Office of PRC, Notification of the Decision of Rejection, dated Nov. 30, 2017, regarding Application No. 201480022123.3, 14 pages.

Japanese Notice of Reasons for Rejection and English translation, dated Oct. 24, 2017, regarding Application No. 2016-223549, 7 pages.

European Patent Office Examination Report, dated Oct. 31, 2017, regarding Application No. 14721157.7, 4 pages.

\* cited by examiner

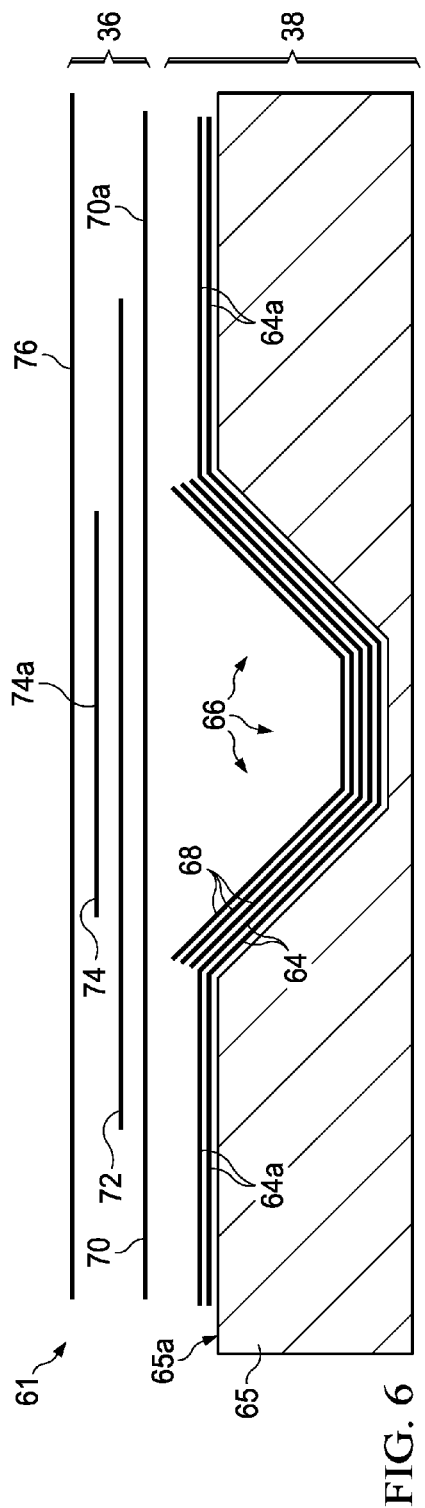
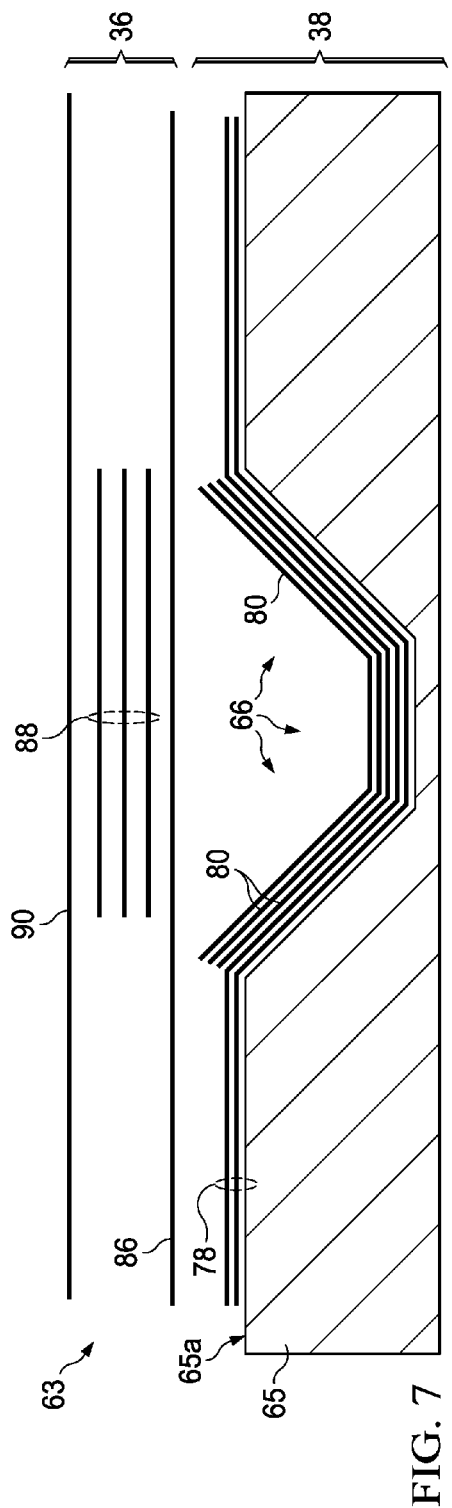
FIG. 6
FIG. 7

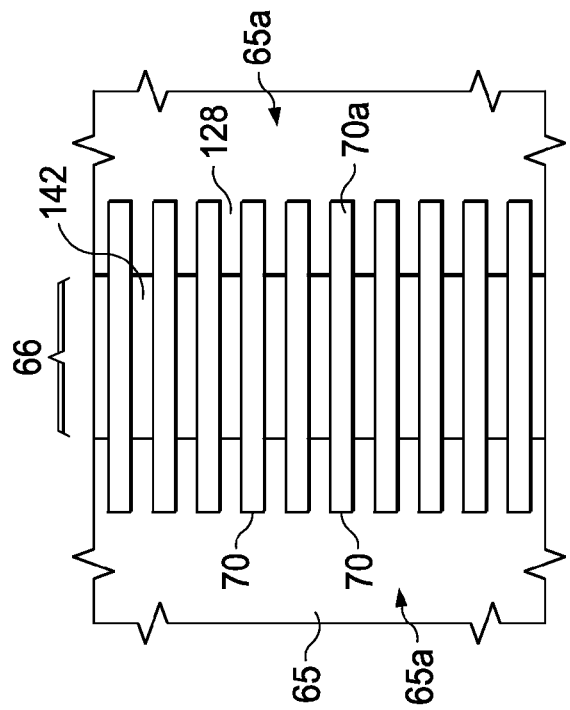
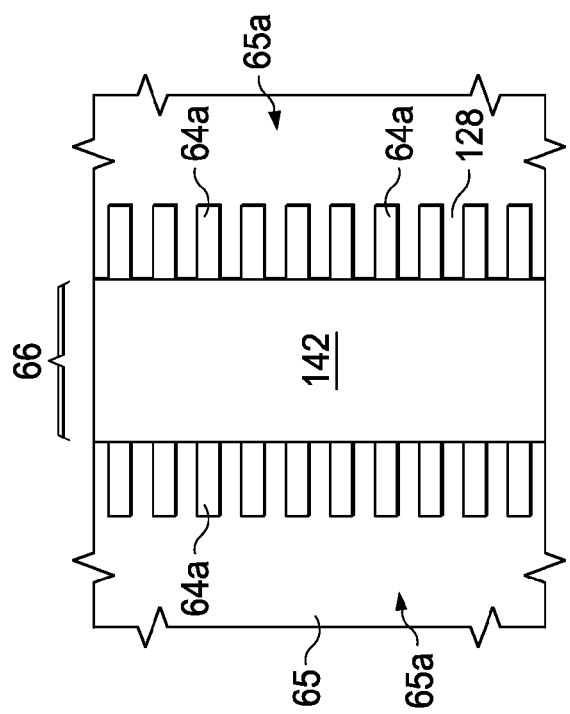

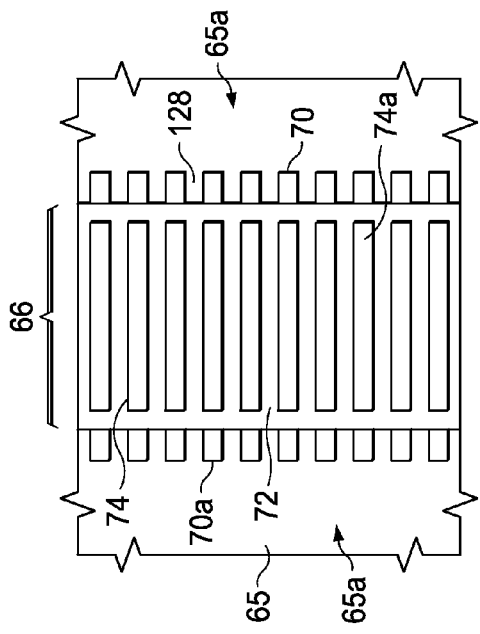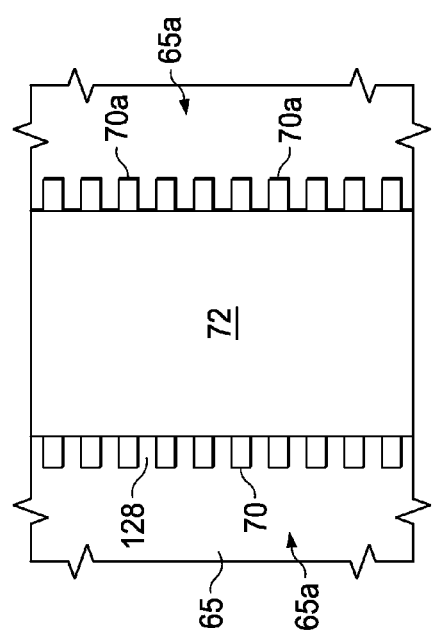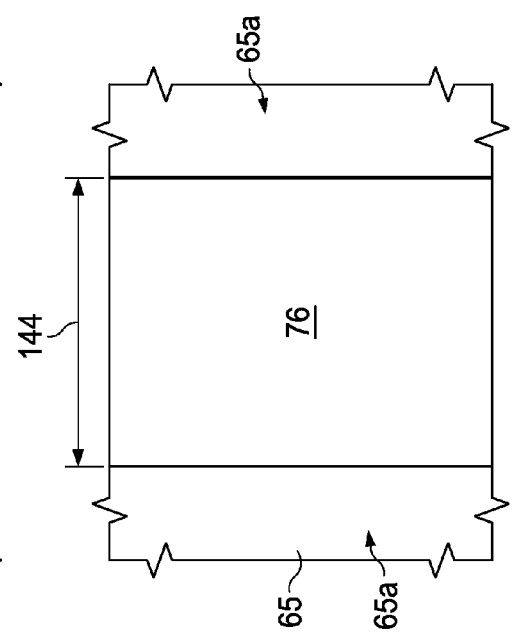

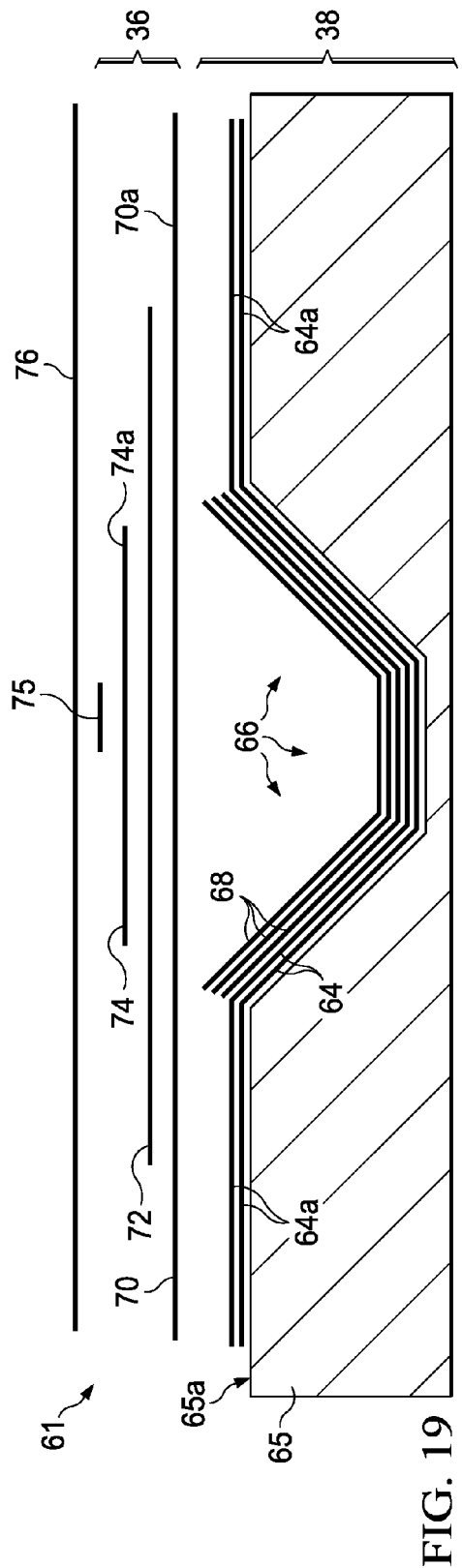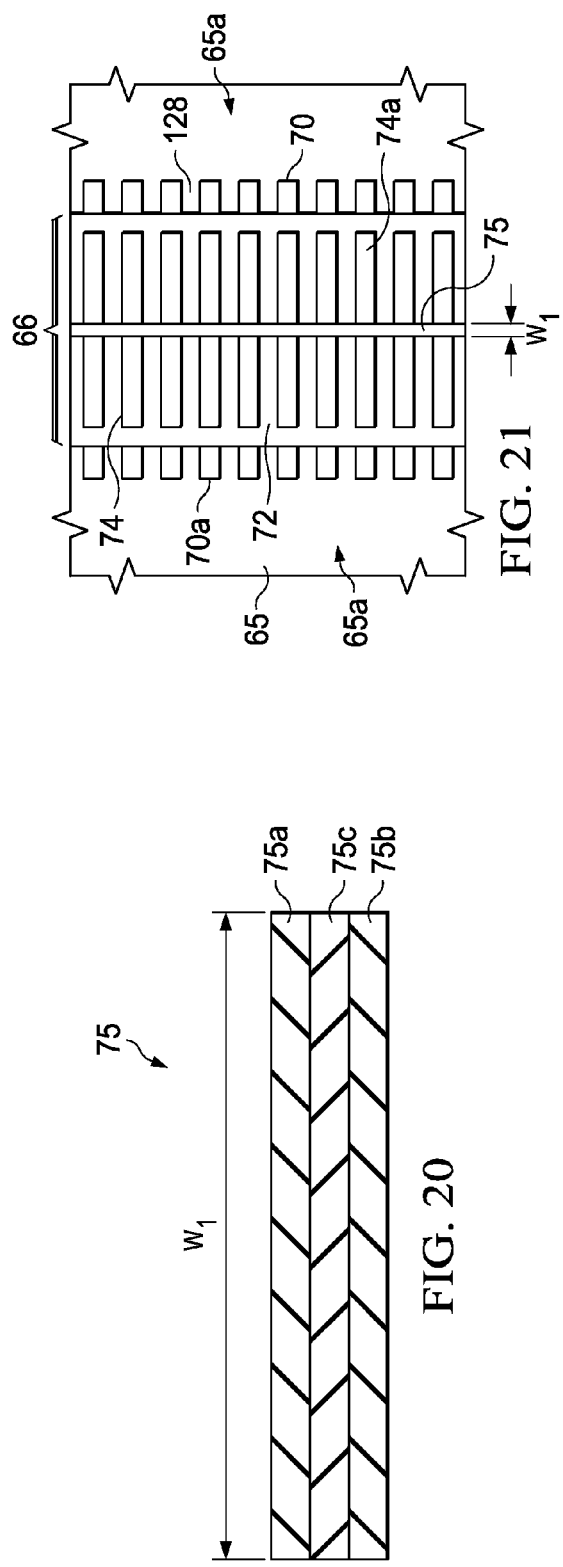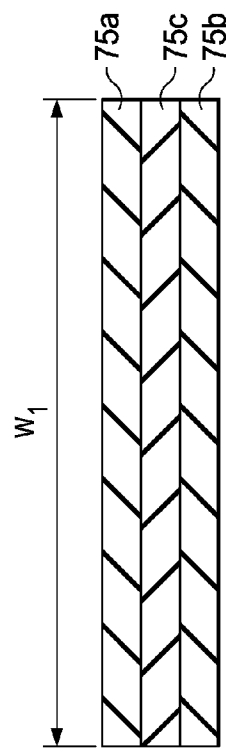

FLEXIBLE COMPACTOR WITH REINFORCING SPINE

CROSS REFERENCE TO RELATED APPLICATIONS

This application is a continuation-in-part of prior co-pending U.S. patent application Ser. No. 13/205,226 filed, Aug. 8, 2011, the entire disclosure of which is incorporated by reference herein.

BACKGROUND INFORMATION

1. Field

The present disclosure generally relates to the fabrication composite structures, and deals more particularly with a flexible compactor for transporting, placing and compacting contoured composite stiffeners.

2. Background

During the fabrication of contoured composite stiffeners such as stringers, a compactor may be used to compact a layup of the stringer against tool surfaces. In some cases, the tool surfaces may be contoured along one or more planes. Compactors have been developed that are flexible along a single plane of curvature, consequently where the stringer is contoured in more than one plane, the tool surfaces have relatively complex geometries that require the compaction process to be performed by hand.

When laying up compound contoured composite stringers by hand, wrinkles may form in the laminate plies which gather at various points in the layup and/or undesired fiber distortion may occur. Using hand layup techniques, the location of ply wrinkles and ply gathering is difficult to control, thus introducing variations in the finished part that may affect part performance. Also, the human factor involved in hand layup may introduce process variations that lead to undesired inconsistencies in the finished parts.

Another problem with flexible compactors relates to their durability. In areas of the compactor that are formed from rubber or a similar flexible material, repeated use of the compactor may result in undesired deformation or buckling of the rubber, causing kinking of the compactor. This deformation may alter the geometry of the compactor, such that area of the contact between the compactor and the stringer is reduced, and/or the manner in which loads are transmitted between the compactor and the stringer is altered.

Accordingly, there is a need for a method and device for compacting contoured composite stiffeners such as stringers which may consistently and predictably distribute ply wrinkles and gathering in a manner that improves part quality and/or performance. There is also a need for a compactor device that is durable and maintains its geometry as well as its load transfer properties after repeated use.

SUMMARY

The disclosed embodiments provide a flexible compactor for transporting, placing and compacting composite stiffeners, such as stringers, that are contoured in more than one plane. The compactor places and compacts stringer layups in a cure tool in a manner that regulates and standardizes the distribution of ply wrinkling and/or ply gathering. The disclosed compaction device is flexible in multiple planes and conforms to contours of the stringer regardless of undulations in stringer geometry. Predictable ply wrinkling/gathering allows engineering changes to be made in the stringer design which compensate for the ply wrinkling and/gathering, thereby improving part quality and/or performance. The flexible compactor is robust, durable and particularly well-suited to high rate production environments. The compactor employs a reinforcing spine that prevents permanent deformation and/or undesired of buckling or kinking of the compactor.

According to one disclosed embodiment, a flexible compactor is provided for use in fabricating a contoured elongate composite structure. The compactor includes at least one compactor section adapted to engage and conform to the contour of the composite structure. The first compactor section includes a flexible joint, as well as a reinforcing spine extending through the flexible joint. The flexible joint includes a rubber that is longitudinally reinforced by the spine. The compactor section includes a hat portion and a cap portion, and the flexible joint is located within the cap portion and allows the cap portion to flex along at least a first plane. The cap portion has a thickness, and the flexible joint extends substantially throughout the entire thickness of the cap portion. The flexible joint includes a flexible rubber, and the reinforcing spine extends through the flexible rubber. The reinforcing spine may include unidirectional fiber reinforced resin. The unidirectional fiber reinforced resin includes a plurality of plies of carbon fiber reinforced tows. The compactor section is elongate and includes a neutral axis, and the reinforcing spine is located near and extends along the neutral axis. The flexible joint includes at least one ply of a flexible material having a width, and the reinforcing spine includes at least one ply of reinforcement having a width that is less than the width of the flexible material.

According to another disclosed embodiment, a flexible compactor is provided for transporting and compacting a contoured composite stiffener layup having a cavity therein. The compactor comprises a hat portion adapted to be placed within the cavity, and a cap portion coupled with the hat portion. The cap portion is flexible within a first plane, and includes at least one flexible joint. The cap portion also includes a reinforcing spine for reinforcing the flexible joint. The flexible joint includes laminated plies of a flexible material, and the cap portion includes strips of substantially rigid reinforcement extending transversely across a width of the cap portion. The reinforcing spine may be sandwiched between the laminated plies of flexible material and extends longitudinally along the cap portion and through the flexible joint. The reinforcing spine is aligned with and located near a neutral axis of the combination of the cap portion and the hat portion. The cap portion includes strips of substantially rigid reinforcement extending transversely across a width of the cap portion, and the reinforcing spine extends longitudinally along a length of the cap portion. The flexible joint may contain a rubber, and the reinforcement strips may be spaced apart from each other along the length of the cap portion and define transverse slots. The slots are substantially filled with the rubber. The reinforcing spine may include at least one ply of unidirectional fiber reinforced resin passing through the flexible joint. The ply of unidirectional fiber reinforced resin has a width less than a width of the reinforcement strips. The ply of unidirectional fiber reinforced resin has a fiber orientation substantially aligned with a length of the cap portion.

According to still another disclosed embodiment, a method is provided of making a compactor that is flexible in orthogonal planes for compacting a contoured composite stiffener of layup. The method comprises laying up at least a first portion of the compactor by placing a plurality of composite reinforcement strips in generally parallel, spaced apart relationship to each other. Flexible joints are formed between the reinforcement strips by laminating at least one ply of flexible rubber with the reinforcement strips the method also includes reinforcing the flexible joints by laminating a reinforcing spine with the ply of flexible rubber. Laying up the first portion of the compactor includes providing at least one flat ply of fiber reinforced resin, castellating opposite edges of the flat ply to form flange strips on the flat ply, and laying up the reinforcement strips over the flange strips. Forming the flexible joints between the reinforcement strips includes laminating two plies of flexible rubber, and reinforcing the flexible joints includes laying up tows of unidirectional fiber reinforced resin and laminating the tows between the two plies of flexible rubber. Laying up the tows of unidirectional fiber reinforced resin includes locating the tows generally parallel to and near a neutral axis of the compactor.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

FIG. 1A is an illustration of an end view of the flexible compactor shown in FIG. 1.

FIG. 6 is an illustration of an exploded, cross sectional view of a ply layup employed to form a section of the flexible compactor shown in FIG. 1.

FIG. 7 is an illustration similar to FIG. 6 but showing a ply layup employed to form another section of a flexible compactor shown in FIG. 1.

FIGS. 10-17 are illustrations of a plan views of a layup tool and successive ply layup steps used to fabricate the flexible compactor.

FIG. 19 is an illustration of an exploded, sectional view, similar to FIG. 6, but showing an alternate embodiment of the flexible compactor having a reinforcing spine.

FIG. 20 is an illustration of a cross-sectional view of the reinforcing spine shown in FIG. 19.

FIG. 21 is illustration of a plan view of a layup employed to form the flexible compactor shown in FIG. 19.

DETAILED DESCRIPTION

Figure 1:
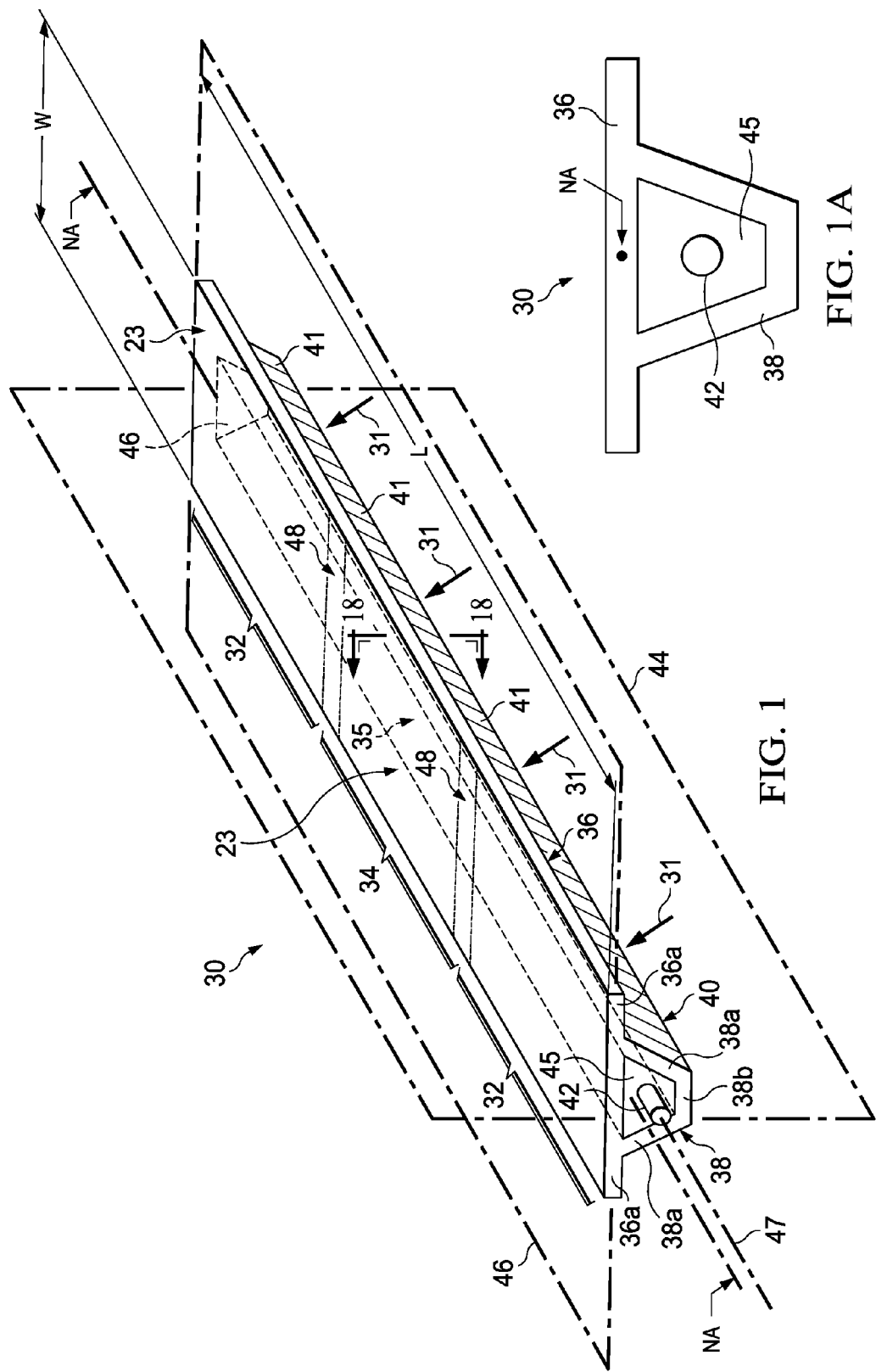
FIG. 1 is an illustration of a perspective view of a flexible compactor having a reinforced spine according to one disclosed embodiment.

Referring first to FIGS. 1-5, a flexible compactor 30 (FIG. 1) may be used to transport, place and compact a curved composite laminate stiffener, such as without limitation, the contoured hat stringer 50 shown in FIGS. 2-5. During transport and placement of the stringer 50, the stringer 50 is held on the compactor 30 by a vacuum suction force 31. The compactor 30 is generally semi-rigid, with a degree of flexibility that allows it to flex and conform to complex tool surfaces (not shown in FIG. 1) during placement and compaction of a stringer layup in a tool. The compactor 30 is flexible in orthogonal planes 44, 46. The compactor 30 is elongate and has a longitudinal axis 47, as well as a neutral axis "NA". The neutral axis "NA" is a line within the cross section of the compactor 30 at which substantially no extension or compression of the compactor 30 occurs when the compactor 30 bends or flexes. The compactor 30 broadly comprises a first, segmented hat portion 38, and a second, continuous, generally planar cap portion 36. The hat portion 38 includes inclined side walls 38a and a bottom wall 38b.

The cap 36 includes laterally extending flanges 36a. The cap portion 36, along with the hat portion 38 and a pair of end walls 45, form an enclosed interior space 35 extending substantially the entire length "L" of the compactor 30. A pneumatic fitting 42 in one or both of the end walls 45 is adapted to couple the interior space 35 of the compactor 30 with a suitable vacuum source (not shown) for drawing a vacuum within the compactor 30. As will be discussed below, the hat portion 38 includes a plurality of generally parallel slits 40 therein which allow air to be drawn through the hat portion 38 into the interior space 35. The slits 40 extend substantially the entire height of the hat portion 38 and divide it into individual segments 41 that allow the hat portion 38 of the compactor 30 to flex during placement and compaction of the layup in the tool. The slits 40 also allow air to be drawn into the interior space 35, creating a vacuum 31 suction force that holds the stringer 50 on the compactor 30 during transport, placement and compaction process. This vacuum adhesion of the stringer 50 to the compactor 30 may permit a more symmetrical distribution of ply wrinkling and gathering during stringer compaction.

The compactor 30 includes at least a first single flexible section 32 and at least a second double flexible section 34. The sections 32, 34 are coupled with each other by joints 48 that are suitable for the application, such as, without limitation, splice joints, scarf joints or butt joints. In the illustrated embodiment, the compactor 30 includes only one section 34 coupled between two of the sections 32 by two joints 48. However, the compactor 30 may have more than one of the sections 34 located at any area along the length of the compactor 30, including on either end of the compactor 30. In some embodiments, substantially the entire compactor 30 may comprise a double flexible section 34. The compactor 30 may have more or less than two of the single flexible sections 32.

Figure 22:
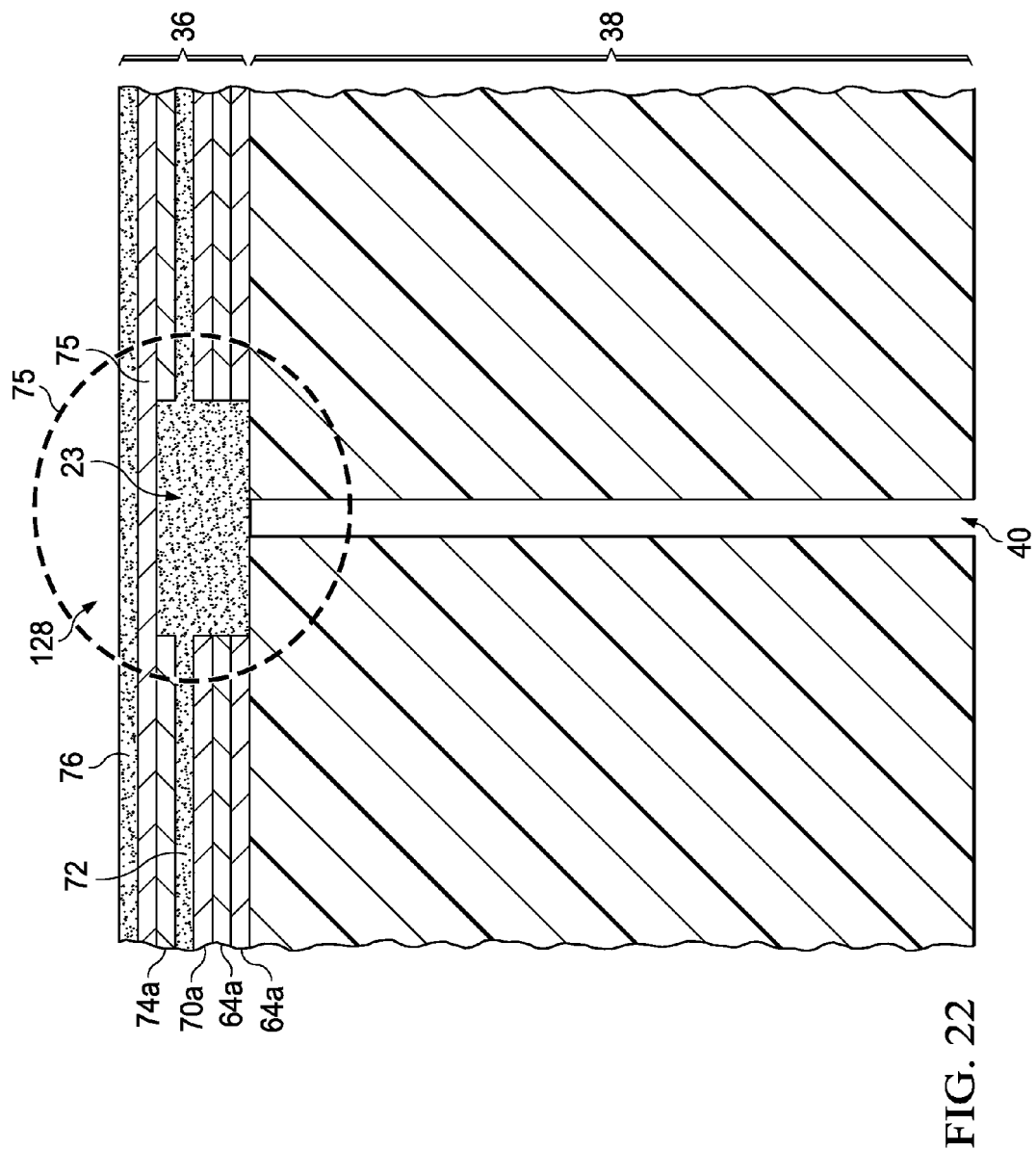
FIG. 22 is an illustration of a sectional view, similar to FIG. 18, but showing use of reinforcing spine.

Section 34 of the compactor 30 includes flexible joints 23 (see also FIGS. 18 and 22) that allow section 34 to flex in each of two planes 44, 46 that are substantially orthogonal to each other. Plane 44 extends substantially parallel to and through the cap 36, while plane 46 extends substantially perpendicular to the cap 36. The flexible joint 23 may also allow torsional twisting of the compactor 30 along its longitudinal axis 47. As will be discussed later in more detail, a reinforcing spine (not shown in FIG. 1) in the cap portion 36 located near the neutral axis "NA" reduces or eliminates undesired deformation of the flexible joint 23.

Both the cap portion 36 and the hat portion 38 may be formed from laminated plies (not shown in FIG. 1) of fiber reinforced resin, such as without limitation, carbon fiber epoxy. The number and thickness of the plies used to form the cap portion 36 in section 32 are chosen such the cap portion 36 is flexible within plane 44 to the degree necessary to allow the compactor 30 to conform with curved tool surfaces (not shown) during placement and compaction the stringer layup in the tool. The slits 41 in the hat portion 38 allow the hat portion 38 to flex along with the cap portion 38 within the plane 44.

As will be described later, the area of the cap portion 36 that lies within the double flexible section 34 of the compactor 30 is formed from a combination of materials that are co-cured to form a plurality of flexible joints 23. These flexile joints 23 allow the cap portion 36 to flex within both planes 44, 46, as well as to twist about its longitudinal axis 47. Although permitting the cap portion 36 to flex in both planes 44, 46, the provision of a reinforcing spine 75 (FIG. 22) in the cap portion 36 provides the cap portion 36 with sufficient strength and longitudinal rigidity to prevent undesired deformation of the flexible joints 23 which may affect the performance of the flexible compactor 30 over its service life. The slits 40 in the hat portion 38 also allow the area of the hat portion 38 within section 34 to flex within plane 46. As a result of the ability of the compactor 30 to flex within two planes 44, 46 and conform to the geometry of a contoured tool 158 (FIGS. 24-26) or other surface during the stringer placement and compaction process, the location and/or pattern of ply gathering and/or ply wrinkling (not shown) may become more consistent, regular and/or predictable from part-to-part, allowing suitable compensating engineering changes to be made to the design of the stringer 50 which may improve the performance of the stringer 50.

Figure 2:
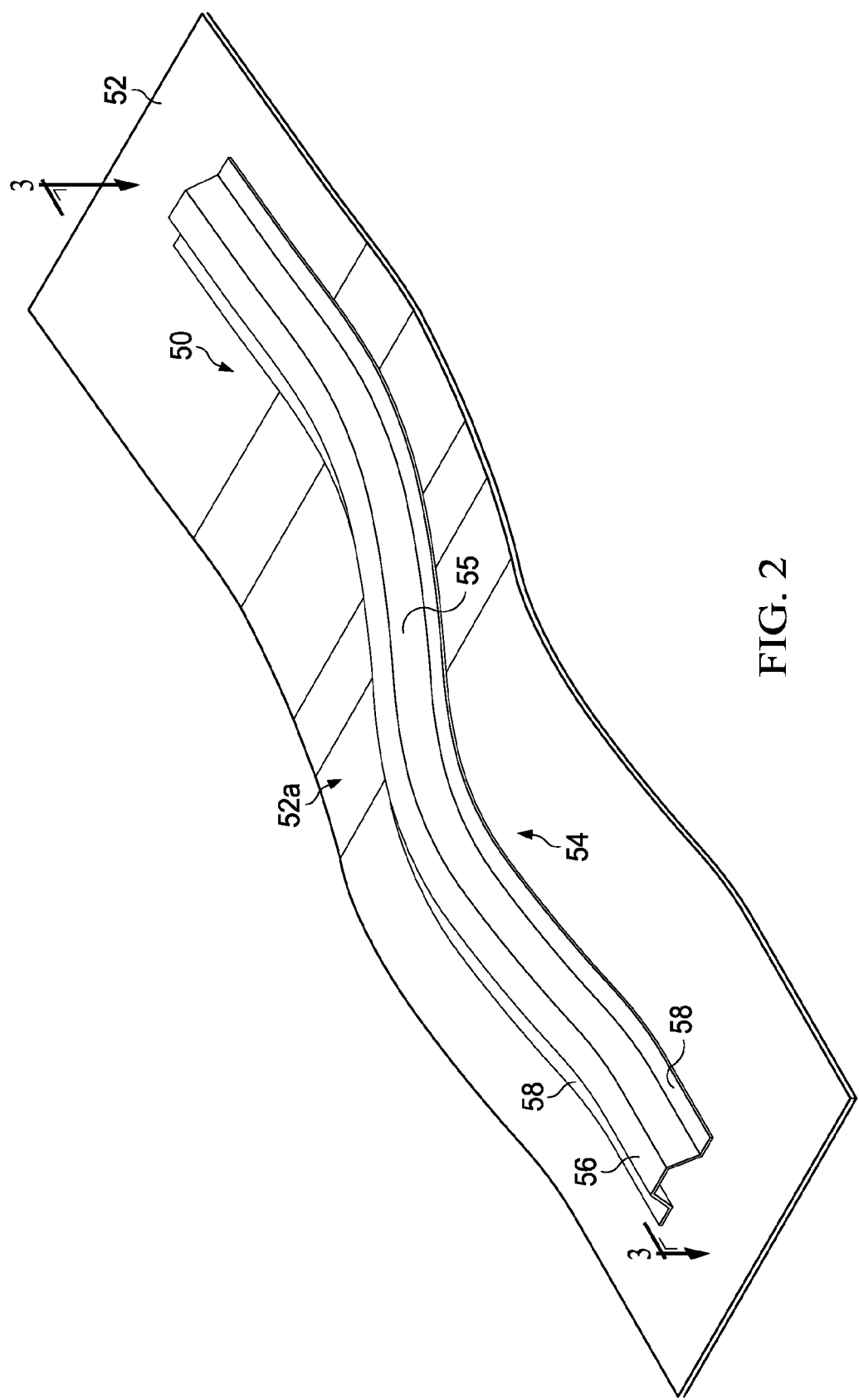
FIG. 2 is an illustration of a perspective view of a composite stringer attached to an aircraft skin curved in two planes.
Figure 3:
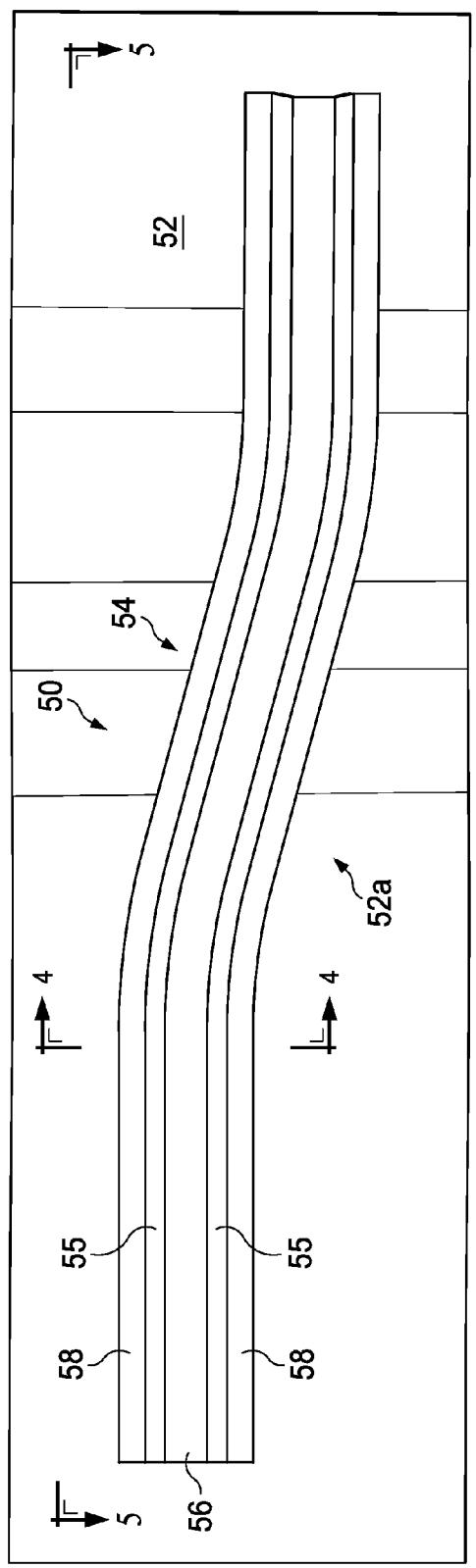
FIG. 3 is an illustration of a side view of the stringer shown in FIG. 2.
Figure 4:
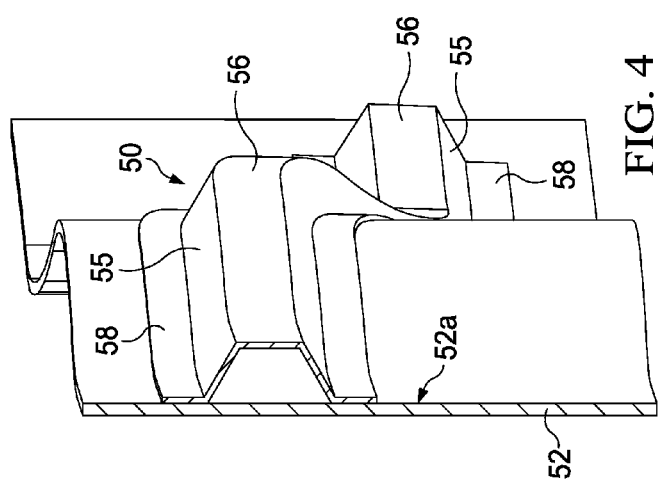
FIG. 4 is an illustration of a sectional view taken along the line 4-4 in FIG. 3.
Figure 5:
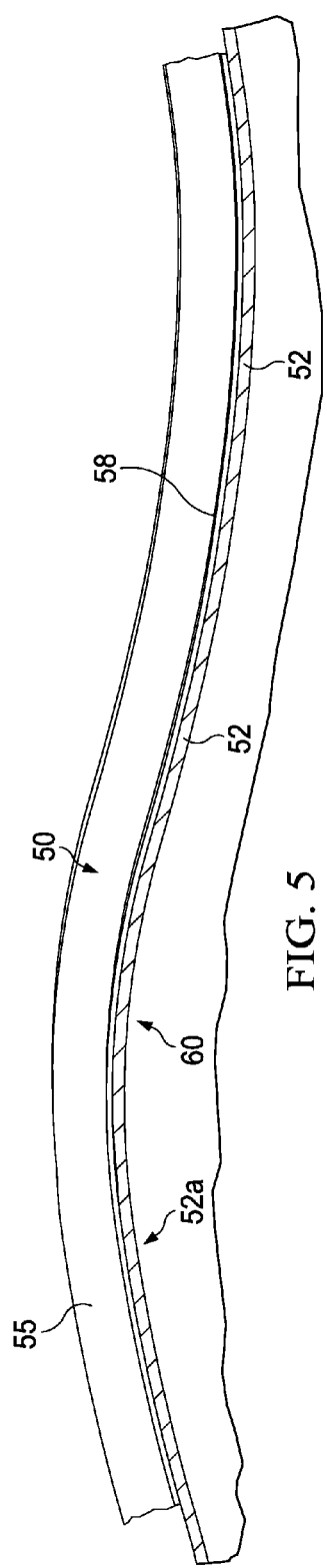
FIG. 5 is an illustration of a sectional view taken along the line 5-5 in FIG. 3.

Referring now to FIGS. 2-5, the hat stringer 50 has a generally hat shaped cross section comprising a top 56, inclined side walls 55, a pair of laterally extending flanges 58. The stringer 50 may be attached to the interior surface 52a of a skin 52 having compound contours to which the stringer 50 may be required to conform. The flanges 58 of the stringer 50 may be secured to the skin 52 by any suitable means, such as fasteners (not shown), bonding adhesives or by co-curing the composite stringer 50 with the skin 52 in those applications where the skin 52 is a composite. As shown in FIGS. 2 and 3, the stringer 50 has a first out-of-plane curvature 54, and as shown in FIG. 5 has a second out-of-plane curvature 60 conforming to the compound contours of the skin surface 52a.

Attention is now directed to FIG. 6 which illustrates a typical ply layup 61 used to form section 34 of the compactor 30 shown in FIG. 1. The layup 61 is formed ply-by-ply on a layup tool 65 having a cavity 66 for forming the hat portion 38 of the stringer 50, and flange surfaces 65a for forming the cap portion 36. Two full width plies 64 of fiber reinforced resin are laid over the cavity portion 66 and covering the flange surfaces 65a. Three additional plies 68 of fiber reinforced resin are laid up within the cavity portion 66. In one embodiment, plies 64 may be biased plies, while plies 68 may comprise a combination of biased plies and plain weave plies. The number of plies and their fiber orientations may vary, depending on the application.

A sixth ply 70 comprises a plurality of reinforcement strips 70a of unidirectional fiber reinforced resin which are spaced apart along the length of the tool 65 and each have fiber orientations extending transversely across the cavity portion 66. The sixth ply 70 may comprise one or more stacked reinforcement strips 70a of unidirectional pre-preg tape. A seventh ply 72 comprises a layer of flexible uncured synthetic rubber, such as, without limitation, Viton® fluoroelastomer, which has a width slightly less than the strips in the sixth ply 70. The seventh ply 72 may comprise other materials that remain flexible following curing. An eighth ply 74 comprises a second set unidirectional fiber reinforced resin strips 74a which cover the cavity portion 66 of the tool 65 and are respectively aligned with the strips 70a forming ply 70, as will be discussed in more detail below. A final ninth ply 76 comprises a second full width layer of flexible uncured synthetic rubber, which may also be a fluoroelastomer such as Viton®. The hat portion 38 of the layup 61 is formed by plies 64 and 68, while the cap portion 36 is formed by a combination of plies, 64, 70, 72, 74 and 76.

Referring to FIG. 7, the layup 63 forming section 32 of the compactor 30 comprises a pair of full width plies 78 extending across the cavity portion 66 and over flange surfaces 65a of the tool 65. Three additional plies 80 are laid up over the cavity portion 66. Next, a full width ply 86 is laid up, followed by three plies 88 that cover only the cavity portion 66. Finally, another full width ply 90 is laid up. Each of the plies of the layup 63 may be comprise a unidirectional or woven fiber pre-preg having fiber orientations selected for the particular application.

Figure 9:
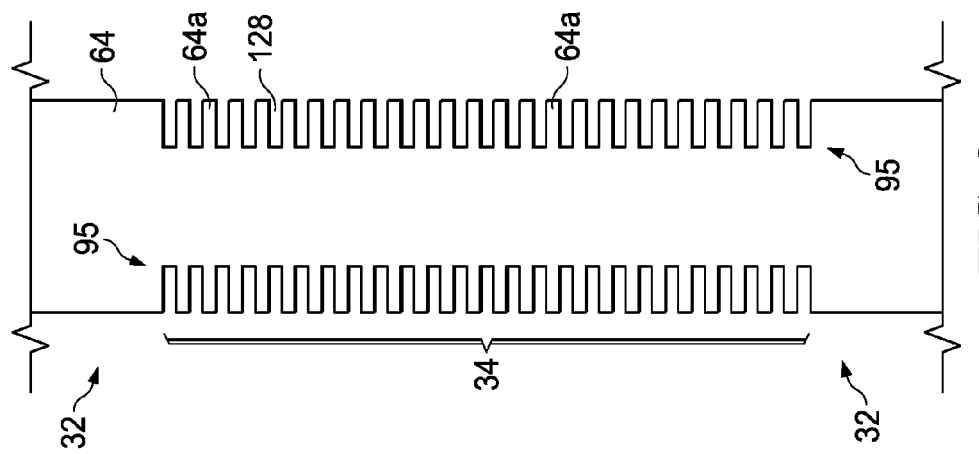
FIG. 9 is an illustration similar to FIG. 8, but showing opposing edges of a portion of the ply having been castellated.
Figure 8:
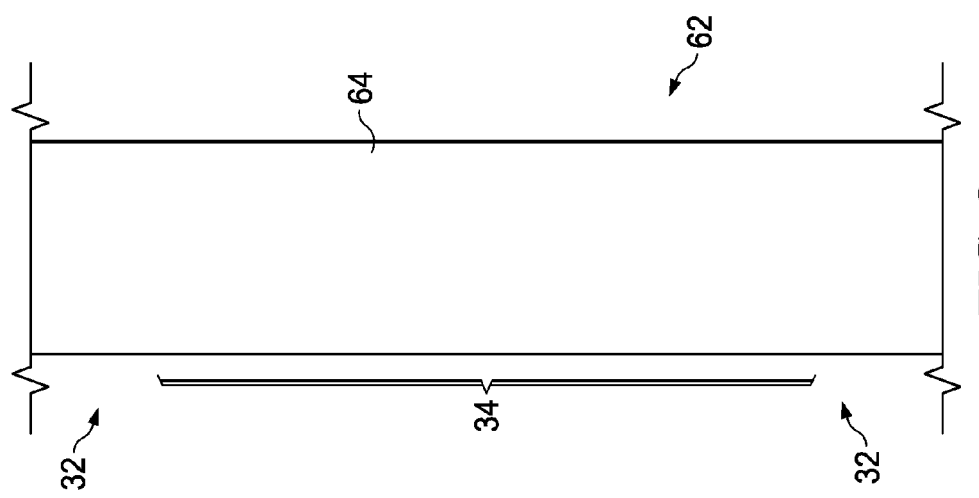
FIG. 8 is an illustration of a plan view of a ply forming part of the layups shown in FIGS. 6 and 7.

Attention is now directed to FIGS. 8-17 which illustrate the sequential steps used to form the layup 61 shown in FIG. 6. Referring first to FIG. 8, a substantially flat layup 62 of plies 64 shown in FIG. 6 is provided which has a length substantially equivalent to that of all three sections 32, 34 of the compactor 30. Next, as shown in FIG. 9, the opposing edges 95 along compactor section 34 of the layup 62 are castellated using any suitable material removal technique, such as, without limitation, die cutting. This castellation results in a series of reinforcement flange strips 64a in each of the plies 64 which are spaced apart along the length of section 34 and are separated by slots 128.

Figure 10:
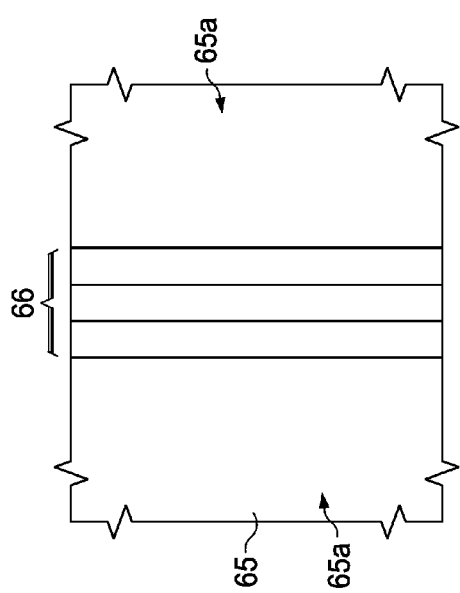

FIG. 10 illustrates the tool 65 ready to receive the ply layup 61 shown in FIG. 6. As previously mentioned, the tool 65 includes a hat shaped cavity portion 66 for forming the hat portion 38 of the compactor 30, and a pair of flange surfaces 65a for forming the flange portions 36a of the cap portion 36 of the compactor 30.

Figure 11:
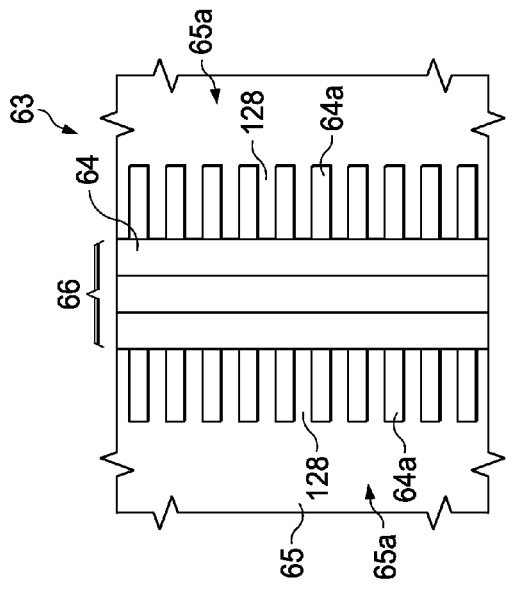
Figure 12:
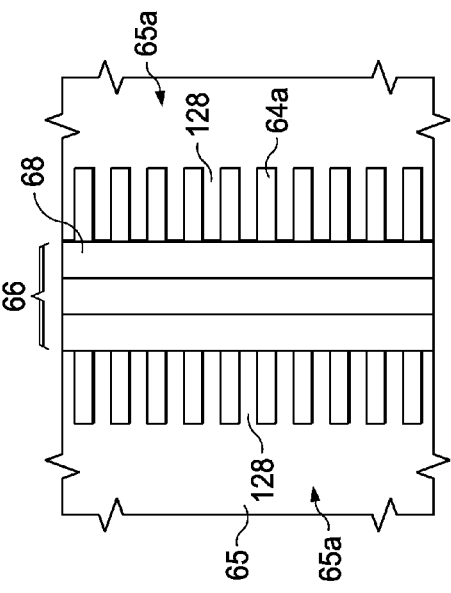

FIG. 11 illustrates the castellated plies 64 having laid up on the tool 65, with the spaced apart flange strips 64a overlying the flange surfaces 65a of the tool 65. FIG. 12 reflects completion of the next step in the layup process, in which the plies 68 are laid up within the cavity portion 66 of the tool 65, overlying plies 64. Then, as shown in FIG. 13, an inflatable bladder 142 is placed in the cavity portion 66, overlying plies 68.

Referring to FIG. 14, the next step in the fabrication process comprises laying up the transversely extending unidirectional pre-preg reinforcement strips 70a, in alignment with and overlying the flange strips 64a (FIG. 13) of the castellated layup 62. Each of the reinforcement strips 70a may comprise one or more plies of unidirectional pre-preg tape, however other types of reinforcements may be possible. The reinforcement strips 70a span substantially the entire width of the cap section 36 and spaced on a pitch that is suited to the particular application.

FIG. 15 shows rubber ply 72 having been laid up over the reinforcement strips 70a following which, as shown in FIG. 16, a second set of generally parallel, spaced apart reinforcement strips 74a are laid up over the rubber ply 72, aligned with both the underlying reinforcement strips 70a and the flange strips 64a (see FIGS. 13 and 14). The reinforcement strips 74a reinforce the area of the cap section 36 that overlies the cavity 66. Finally, as shown in FIG. 17, a second ply 76 of uncured synthetic rubber or similar flexible material is laid up over the reinforcement strips 74a. The second rubber ply 76 spans substantially the entire width of the layup 61.

Figure 18:
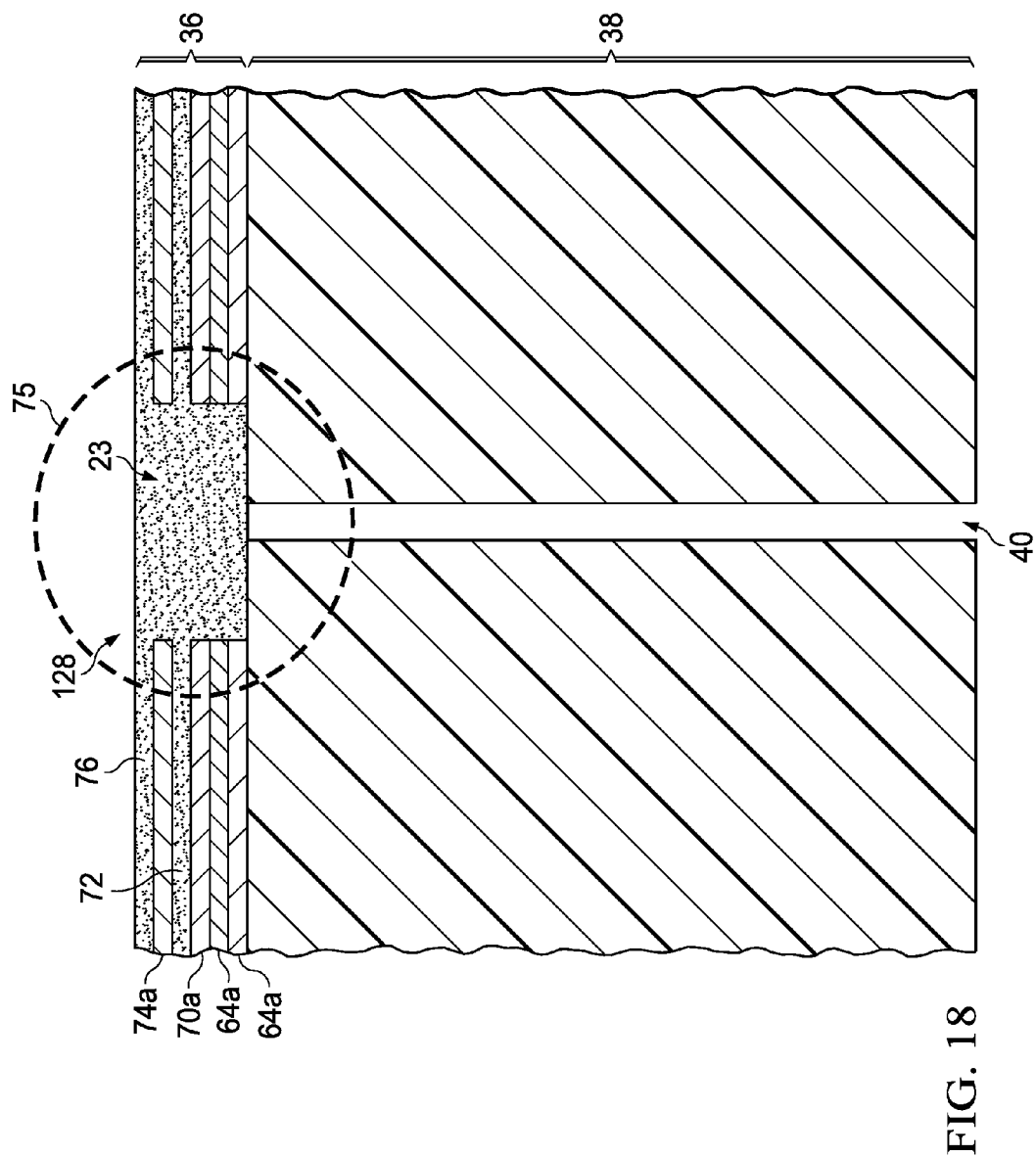
FIG. 18 is an illustration of a sectional view taken along the line 18-18 in FIG. 1, some of the plies being loaded for clarity.

FIG. 18 is a sectional illustration showing one of the flexible joints 23 in compactor section 34. The aligned stacking of the reinforcement strips 64a, 70a, 74a form slots 128 that are filled with rubber from rubber plies 72, 76 during ply lamination of the cap portion 36. Following this lamination, the flexible rubber joints 23 extend across substantially the entire width of the cap portion 36. The reinforcement strips 64a, 70a, 74a provide the compactor section 34 with the rigidity needed to maintain its shape and prevent it from collapsing when a vacuum is drawn within the compactor 30, while the rubber filled slots 128 forming joints 23 allow the cap portion 36 to flex within either of orthogonal planes 44, 46 (FIG. 1). The flexible rubber joints 23 extend through substantially the entire thickness of the cap portion 36, and are aligned to coincide with the location of the slits 40 along the length of the compactor.

Attention is now directed to FIGS. 19-22 which illustrate an alternate embodiment of the flexible compactor 30 which is well-suited for high rate production environments, and applications requiring extended service life. In the embodiment of the flexible compactor 30 previously described in connection with FIGS. 6-18, the reinforcement strips 74a, also sometimes referred to herein as strips of rigid reinforcement, provided transverse reinforcement of the cap portion 36, while the slots 128 between the reinforcement strips 74s are completely filled with rubber. Thus, the flexible joints 23 of the previously described embodiment are entirely composed of rubber.

In some applications, it may be necessary or desirable to provide the flexible joints 23 with longitudinal support. Thus, referring to FIGS. 19-22, the flexible joints 23 (see FIG. 22) may be reinforced and strengthened by a longitudinal reinforcing spine 75 which is substantially centered on and aligned with the longitudinal axis 47 (FIG. 1) of the compactor 30. The reinforcing spine 75 is also located on or near the neutral axis "NA" of the flexible compactor 30. The reinforcing spine 75 may comprise one or more strips or plies of unidirectional fiber reinforced resin having a 0° fiber orientation, arranged substantially parallel to the longitudinal axis 47 of the compactor 30. For example, and without limitation, the reinforcing spine 75 may comprise three laminated plies 75a, 75b, 75c, each comprising unidirectional, split pre-preg tape such as carbon fiber "tows". Although interrupted by the reinforcing spine 75, the flexible rubber joints 23 extend through substantially the entire thickness of the cap portion 36.

The reinforcing spine 75 has a width $W_1$ that is substantially less than the width of the cavity 66. The choice of the width $W_1$ may vary with the application, but generally the width $W_1$ as well as the thickness or number of plies used to form the reinforcing spine 75 should be sufficient to partially carry loads through the flexible joints 23. For example, without limitation, in one typical implementation, the reinforcing spine 75 may have a width $W_1$ of approximately ¼ inch where the reinforcing strips 74a have a width of approximately 3 inches. The relatively narrow with $W_1$ of the reinforcing spine 75 along with its placement at the centerline and close proximity to the neutral axis "NA" substantially precludes any adverse effect that the reinforcing spine 75 may have on the in-plane ability of the compactor 32 follow stringer contours. The use of the reinforcing spine 75 to carry a portion of the loads through the flexible joints 23 may help prevent the flexible joints from permanently deforming, as well as resist mishandling, and prevent the flexible compactor 30 from buckling or kinking at the flexible joints 23. The reinforcing spine 75 therefore helps the compactor 30 to maintain its shape in the area of the flexible joints 23 and increases the ability of the compactor 32 to vacuum adhere to the stringer 50. The reinforcing spine 75 is laid up on top of the reinforcement strips 74a, and is covered by the top rubber ply 76. Thus, in effect, the reinforcing spine 75 is sandwiched between rubber plies 72, 74. It may be possible to place the reinforcing spine in other locations within the stack of plies that form the cap portion 36.

Figure 23:
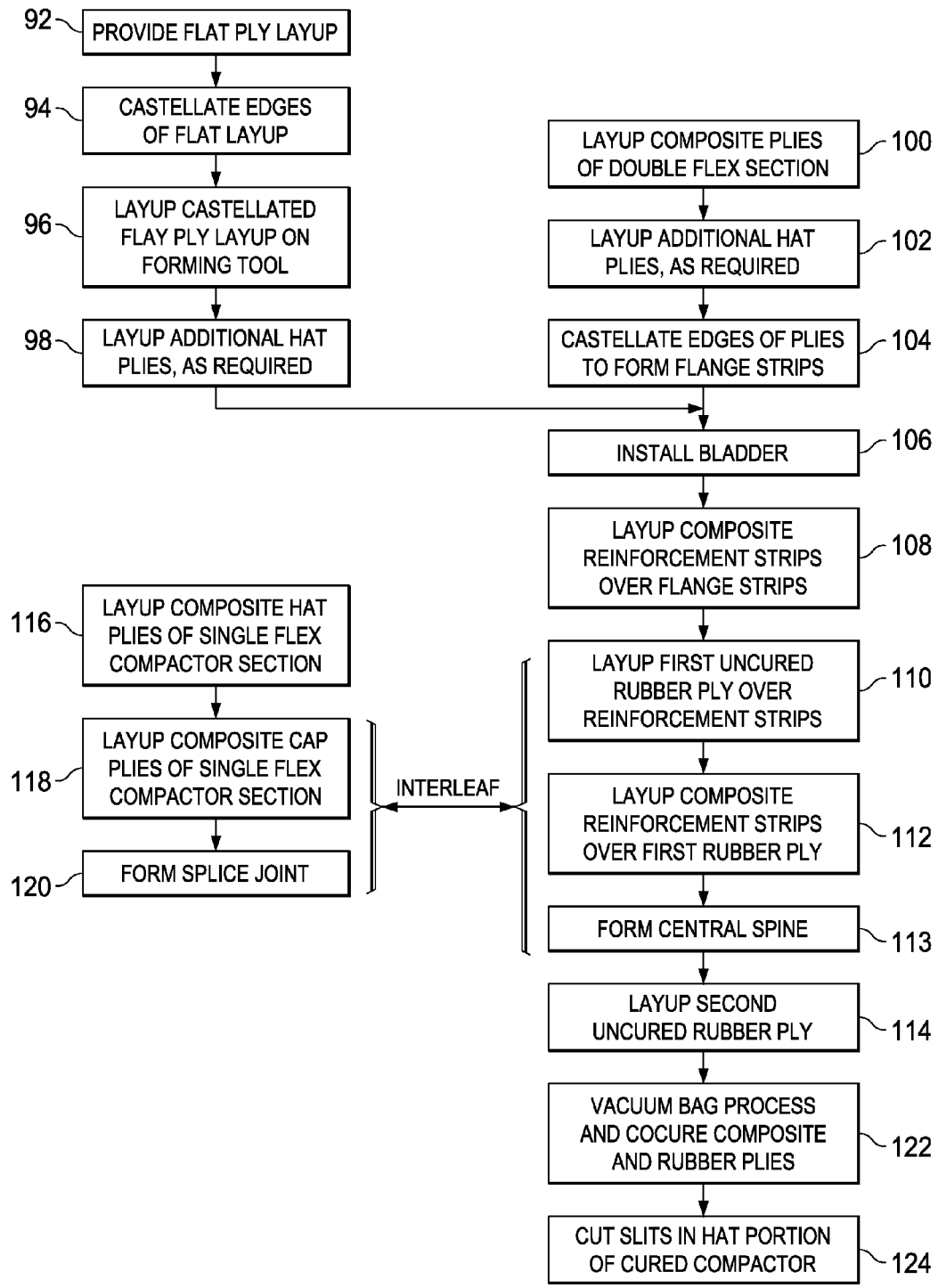
FIG. 23 is an illustration of a flow diagram of a method of fabricating the flexible compactor.

FIG. 23 is a flow diagram illustrating the steps of a method of fabricating the compactor 30. In one embodiment, beginning at step 92, a flat layup 62 of plies 64 is provided, and at step 94 the edges of the layup 62 are castellated. At 96, the castellated layup 62 is placed on and formed over a tool 65, and additional plies 68 may be laid up, as required, to reinforce the hat portion 38 of the compactor 30. Then, as shown at 106, an inflatable bladder 142 is installed in a cavity of the tool 65, overlying plies 64, 68. Alternatively, as shown at 100, plies 64 may be laid up on the forming tool 65 without castellation, following which additional hat plies 68 may be laid up at 102, as required. At 104, the edges of plies 64 are castellated to form the reinforcement flange strips 64a in double flex section 34 of the compactor 30. At 108, the composite reinforcement strips 70a are laid up over the flange strips 64a, and at 110 the first ply 72 of uncured rubber is laid up over the flange strips 64a. At 112, the second set of unidirectional composite reinforcement strips 74a are laid up over the first rubber ply 72 in order to further reinforce the area of the cap portion 36 that overlies the cavity 66. At step 113, a central reinforcing spine 75 is formed by laying up one or more plies of unidirectional fiber reinforced resin over the reinforcement strips 74. The plies forming the reinforcing spine 75 may comprise, for example and without limitation 0° pre-preg tows. The central reinforcing spine 75 is positioned near the neutral axis "NA" of the compactor 30, along the centerline of the cap portion 36. At 114 the second ply 76 of uncured rubber is laid up over the reinforcement strips 74 and the reinforcing spine 75.

Each of the compactor sections 32 is laid up by first laying up the plies of the hat portion 38 in step 116, and then laying up the plies of the cap portion 36 at step 118. As the cap plies of compactor section 32 are being laid up, at least certain of these plies are interleafed with the cap plies of compactor section 34, as shown at step 120, in order to form the overlapping splice joints 48 between compactor sections 32, 34. The joints 48 may reduce localized stiffness and increase the overall durability of the compactor 30. As previously mentioned, although splice joints 48 have been shown in the exemplary embodiment, other types of joints may be possible.

At 122, the compactor layup is vacuum bagged and the rubber and composite resin plies are co-cured, either with or without autoclave processing. Following co-curing, the slits 40 in the hat portion 38 of the compactor 30 are formed by cutting, sawing, or other suitable processes. As previously mentioned, the slits 40 are located and spaced apart from each other such that they are substantially aligned with the rubber filed slots 128.

Figure 25:
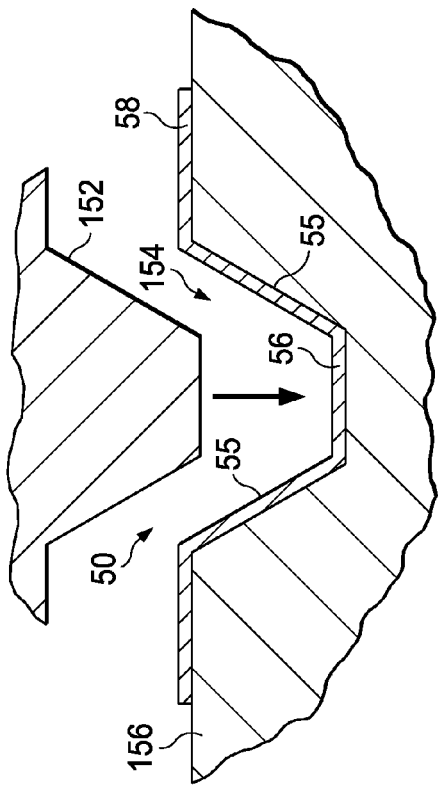
FIG. 25 is an illustration of a sectional view of the hat stringer formed between male and female stamping dies.
Figure 24:
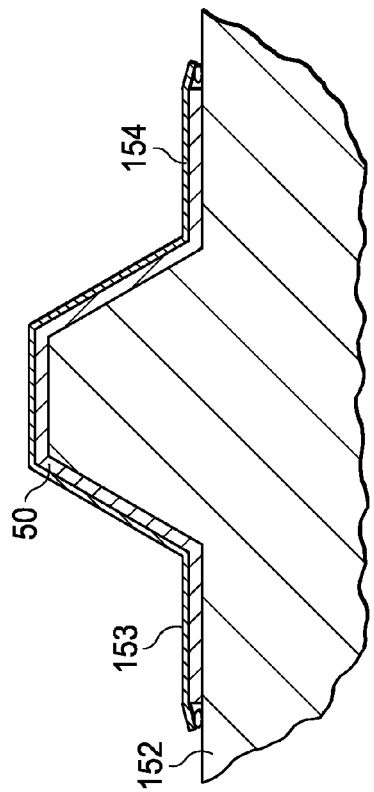
FIG. 24 is an illustration of a cross sectional view of a hat stringer being vacuum bag formed over a male die.
Figure 26:
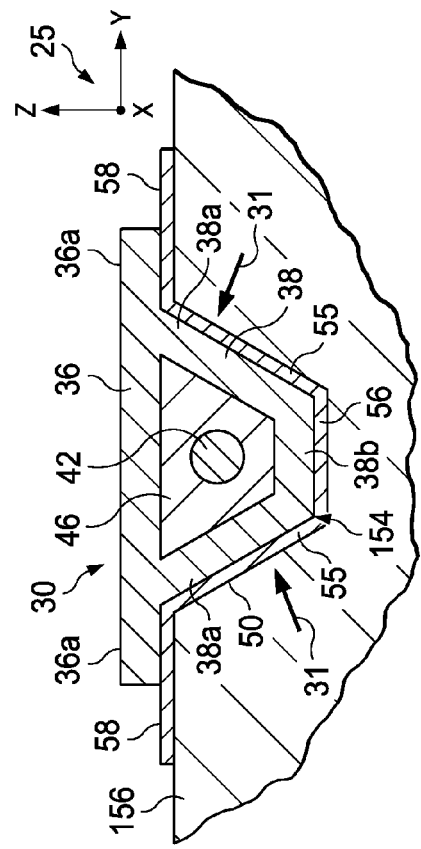
FIG. 26 is an illustration similar to FIG. 25 but showing the flexible compactor having been installed in the stringer layup.

Attention is now directed to FIGS. 24-30 which illustrate the steps of a method of forming, transporting, placing and compacting a composite hat stringer 50 layup using the flexible compactor 30. Referring first to FIG. 24, a composite hat-shaped stringer 50 may be formed by placing a multi-ply composite charge over a male die 152 and using a vacuum bag 153 to compact and form the charge over the die 152. Alternatively, as shown in FIG. 25, the stringer 50 may be formed by stamp forming a composite charge between male and female dies 152, 156, respectively, creating a hat cavity 154. Following forming, the stringer 50 may be trimmed, as necessary. With the stringer 50 supported in the female die 156, the compactor 30 is placed in the hat cavity 154 of the stringer 50 such that the hat 38 portion of the compactor 30 engages sidewalls 55 and the top 56 of the stringer 50, and the flange portions 36a of the compactor cap 36 overlie and engage the flanges 58 of the stringer 50. The stringer 50 and the compactor 30 may remain in the female die 156 which may be used as a holding fixture to maintain the shape of the stringer 50 until the stringer 50 is ready to be removed and transported for placement. Optionally, the stringer 50 may be transferred to a holding fixture (not shown) until ready for placement. In order to remove stringer 50 from the female die 156 (or an optional holding fixture), a vacuum is drawn within the compactor 30 which draws air in through the slits 40 (FIG. 1) to create a suction force 31 (FIG. 26) that causes the stringer 50 to adhere to the compactor 30.

Figure 27:
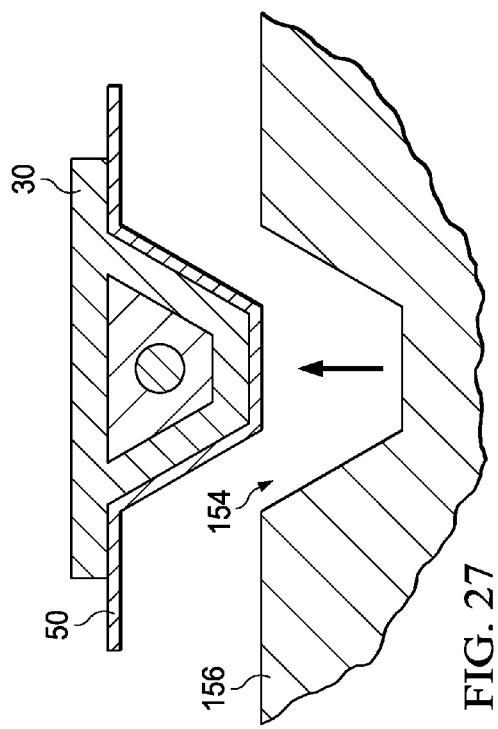
FIGS. 27-30 are illustrations of sectional views showing successive steps of transporting, placing and compacting the hat stringer in a cure tool using the compactor.
Figure 28:
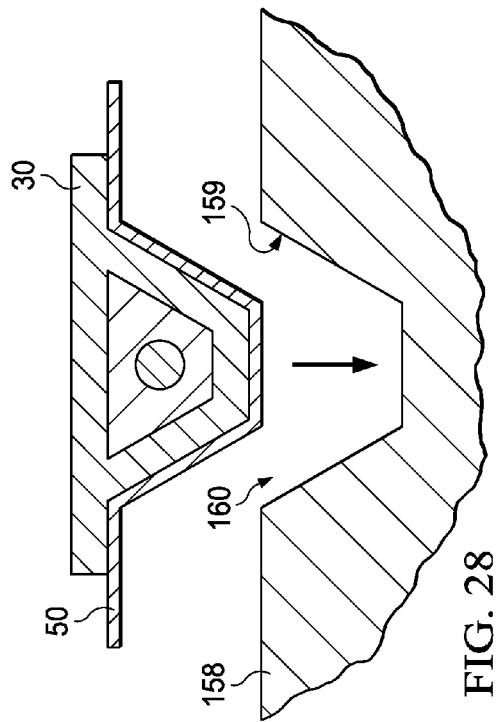
Figure 29:
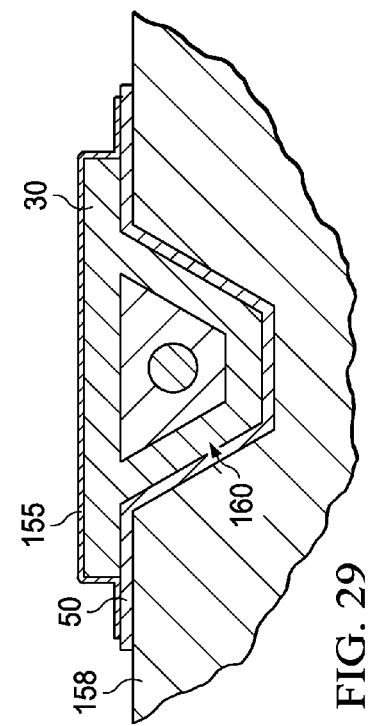
Figure 30:
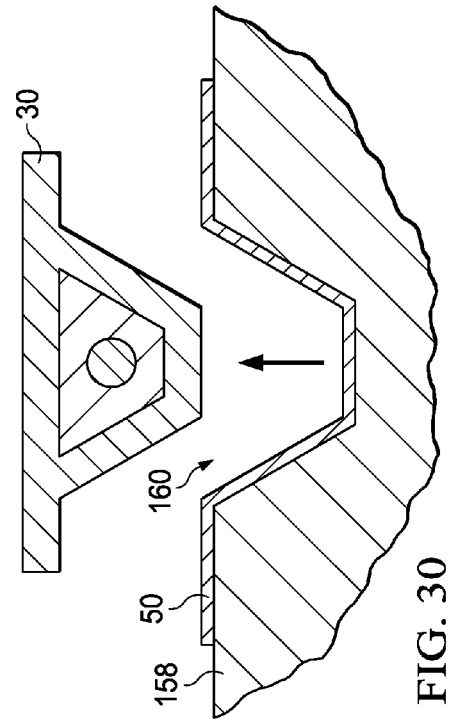

As shown in FIG. 27, with the stringer 50 adhered to the compactor 30, the compactor 30 is lifted along with the stringer 50 away from female die 156, and is used to transport the stringer 50 to a structure such as the tool 158, as shown in FIG. 28, having female tool surfaces 159 that are curved in more than one plane and substantially match the outer mold line (OML) surface (not shown) of the stringer 50. The compactor 30 is used to place the stringer 50 in a cavity 160 of the tool 158, as shown in FIG. 29. With the compactor 30 and the stringer 50 installed in the tool cavity 160, a vacuum bag assembly 155 is installed over the compactor 30 and the stringer 50, and a vacuum is drawn in the bag 155 (FIG. 29) which, along with the compactor 30, compacts the stringer layup 50 against the tool surfaces 159. Following compaction of the stringer 50, as shown in FIG. 30, the compactor 30 is drawn away from the stringer 50. The stringer 50 may then be further processed. For example, fillers (not shown) may be installed in the stringer 50, one or more bladders (not shown) may be installed against the stringer 50, the stringer 50 may be attached to the skin 52 (FIG. 2) and cured in an autoclave (not shown), etc.

Figure 31:
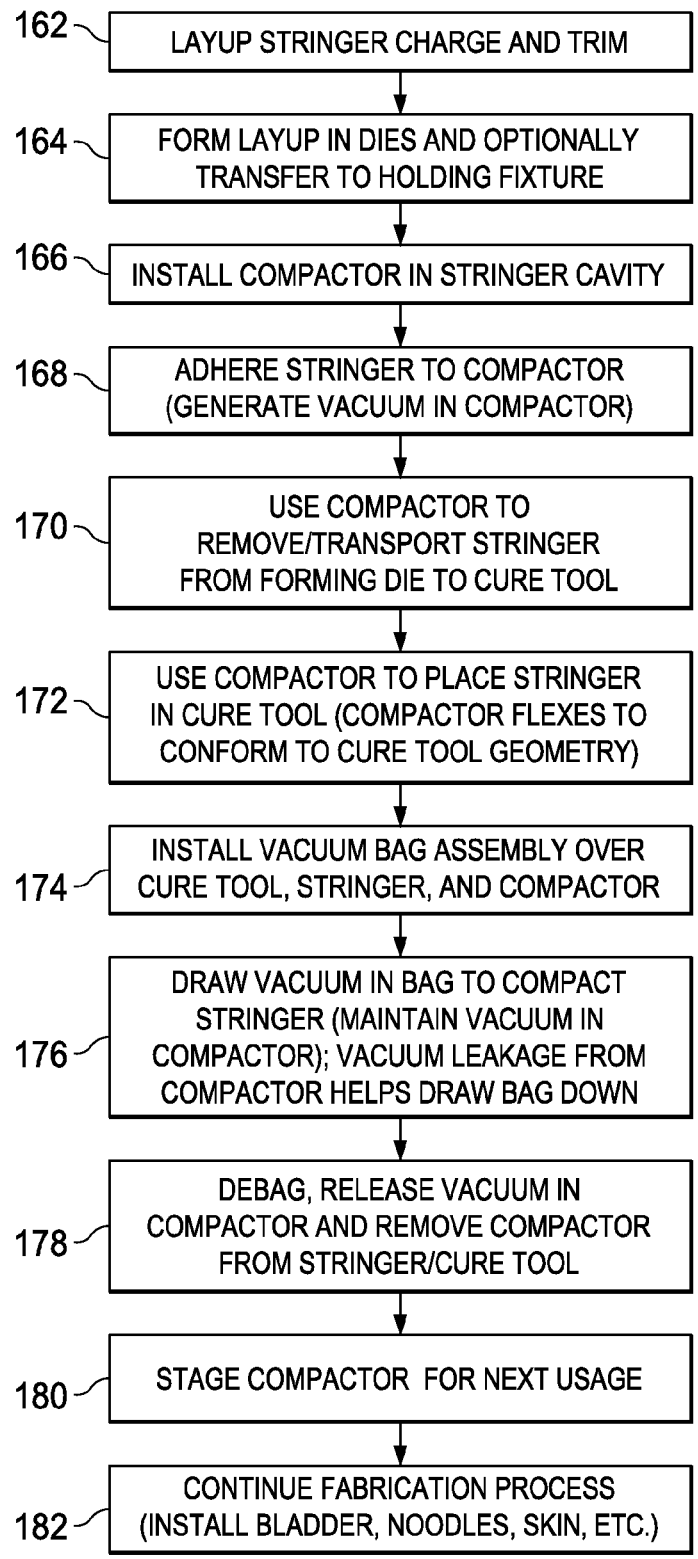
FIG. 31 is an illustration of a flow diagram of a method for fabricating a composite stringer.

FIG. 31 illustrates a flow diagram of the steps of fabricating the stringer 50 previously described in connection with FIGS. 24-29. Beginning at 162, the composite hat stringer 50 charge is laid up and, optionally trimmed, as necessary. At 164, the stringer charge is formed into a stringer shape, as by die stamping or other processes. The formed stringer 50 may be trimmed after it is formed in step 164, if not previously trimmed in step 162. Optionally, the stringer 50 may be transferred to a holding fixture until it is ready to be transported and placed by the compactor 30. At 166, the compactor 30 is installed in the stringer cavity 160. The compactor 30 may remain in the stringer 50 to maintain its shape until the stringer 50 is ready to be removed from the female die 156 or a holding fixture. At 168 the stringer 50 is adhered to the compactor 30 using a force generated by drawing a vacuum within the compactor 30 that sucks the stringer 50 against the compactor 30. Next, at 170, the compactor 30 is used to lift and transport the stringer 50 to a tool, fixture, part or other structure or surface. For example, and without limitation, the compactor 30 may be used to transport the stringer 50 to a tool 158, and then place the stringer 50 at a desired location on the tool 158 or other structure or surface. As the stringer 50 is being placed by the compactor 30, the compactor 30 may flex in either or both of two orthogonal planes 44, 46, or twist around its longitudinal axis 47 (FIG. 1) to the extent necessary to conform the stringer layup 50 to the curved surfaces of the structure, such as the tool surfaces 159.

At 174, a vacuum bag 155 along with other usual bagging components (not shown) are installed and sealed over the tool 158, covering the stringer 50 and the compactor 30. At 176, a vacuum is drawn on the bag 155 which compacts the stringer 50 through the compactor 30, while the vacuum is maintained within the compactor 30. The vacuum drawn within the compactor 30 may aid in evacuating the vacuum bag 155 during the compaction process, as a result of air leaking into the compactor 30 through the slits 40 (FIG. 1). At 178 the stringer layup is debagged, the vacuum within the compactor 30 is released, and the compactor 30 is removed from the tool 158. At 180, the compactor may be staged for reuse in compacting another stringer layup 50. The stringer fabrication process may be continued at 182, depending on the application, by installing fillers in the stinger 50, applying bladders, attaching skins to the stringer, etc.

Figure 32:
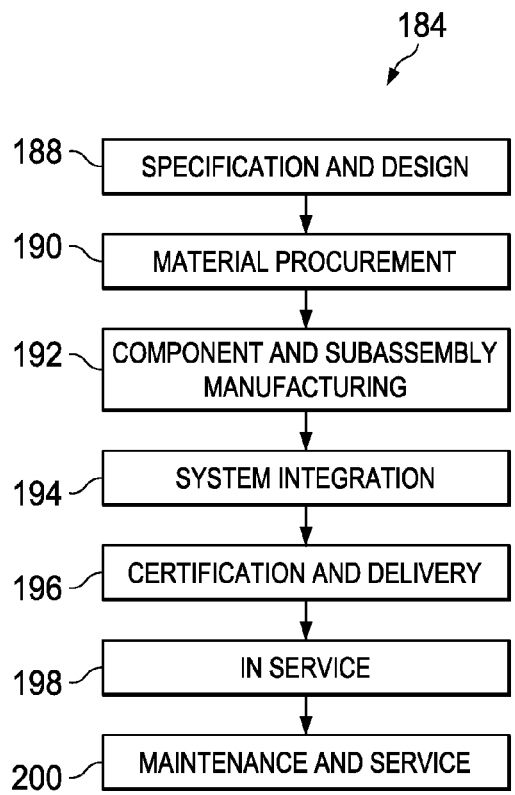
FIG. 32 is an illustration of a flow diagram of aircraft production and service methodology.
Figure 33:
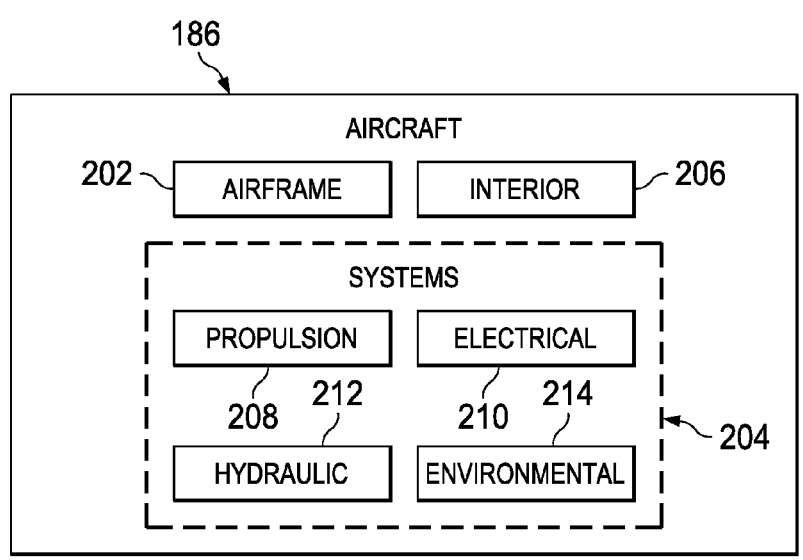
FIG. 33 is an illustration of a block diagram of an aircraft.

Embodiments of the disclosure may find use in a variety of potential applications, particularly in the transportation industry, including for example, aerospace, marine, automotive applications and other application where automated layup equipment may be used. Thus, referring now to FIGS. 32 and 33, embodiments of the disclosure may be used in the context of an aircraft manufacturing and service method 184 as shown in FIG. 32 and an aircraft 186 as shown in FIG. 33. Aircraft applications of the disclosed embodiments may include, for example, without limitation, layup of stiffener members such as, without limitation spars and stringers. During pre-production, exemplary method 184 may include specification and design 188 of the aircraft 186 and material procurement 190. During production, component and subassembly manufacturing 192 and system integration 194 of the aircraft 186 takes place. Thereafter, the aircraft 186 may go through certification and delivery 196 in order to be placed in service 198. While in service by a customer, the aircraft 186 is scheduled for routine maintenance and service 200, which may also include modification, reconfiguration, refurbishment, and so on.

Each of the processes of method 184 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 33, the aircraft 186 produced by exemplary method 184 may include an airframe 202 with a plurality of systems 204 and an interior 206. The airframe 202 may include various stiffeners such as stringers and spars that may be fabricated using the disclosed method and compactor. Examples of high-level systems 204 include one or more of a propulsion system 208, an electrical system 210, a hydraulic system 212, and an environmental system 214. Any number of other systems may be included. Although an aerospace example is shown, the principles of the disclosure may be applied to other industries, such as the marine and automotive industries.

Systems and methods embodied herein may be employed during any one or more of the stages of the production and service method 184. For example, components or subassemblies corresponding to production process 192 may be fabricated or manufactured in a manner similar to components or subassemblies produced while the aircraft 186 is in service. Also, one or more apparatus embodiments, method embodiments, or a combination thereof may be utilized during the production stages 192 and 194, for example, by substantially expediting assembly of or reducing the cost of an aircraft 186. Similarly, one or more of apparatus embodiments, method embodiments, or a combination thereof may be utilized while the aircraft 186 is in service, for example and without limitation, to maintenance and service 200.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A flexible compactor for use in fabricating a contoured elongate composite structure, comprising:
   at least a first compactor section adapted to engage and conform to the contour of the composite structure;
   a flexible joint within the first compactor section; and
   a reinforcing spine extending through the flexible joint, wherein the reinforcing spine includes unidirectional fiber reinforced resin.

2. The flexible compactor of claim 1, wherein:
   the compactor section includes a hat portion and a cap portion, and
   the flexible joint is located within the cap portion and allows the cap portion to flex along at least a first plane.

3. The flexible compactor of claim 2, wherein:
   the cap portion has a thickness, and
   the flexible joint extends substantially throughout the entire thickness of the cap portion.

4. The flexible compactor of claim 2, wherein:
   the flexible joint includes a flexible rubber, and
   the reinforcing spine extends through the flexible rubber.

5. The flexible compactor of claim 1, wherein the unidirectional fiber reinforced resin includes a plurality of plies of carbon fiber reinforced tows.

6. The flexible compactor of claim 1, wherein:
   the compactor section is elongate and includes a neutral axis, and
   the reinforcing spine is located near and extends along the neutral axis.

7. The flexible compactor of claim 1, wherein:
   the flexible joint includes at least one ply of a flexible material having a width, and
   the reinforcing spine includes at least one ply of reinforcement having a width that is less than the width of the flexible material.

8. A flexible compactor for transporting and compacting a contoured composite stiffener layup having a cavity therein, comprising:
   a hat portion adapted to be placed within the cavity; and
   a cap portion coupled with the hat portion and flexible within a first plane, the cap portion including at least one flexible joint, the cap portion further including a reinforcing spine for reinforcing the flexible joint, wherein the reinforcing spine extends longitudinally along the cap portion and through the flexible joint.

9. The flexible compactor of claim 8, wherein:
   the flexible joint includes laminated plies of a flexible material,
   the cap portion includes strips of substantially rigid reinforcement extending transversely across a width of the cap portion, and
   the reinforcing spine is sandwiched between the laminated plies of flexible material.

10. The flexible compactor of claim 8, wherein the reinforcing spine is aligned with and located near a neutral axis of the combination of the cap portion and the hat portion.

11. The flexible compactor of claim 8, wherein:
    the cap portion includes strips of substantially rigid reinforcement extending transversely across a width of the cap portion.

12. The flexible compactor of claim 11, wherein:
    the flexible joint contains a rubber,
    the reinforcement strips are spaced apart from each other along the length of the cap portion and define transverse slots, and
    the slots are substantially filled with the rubber.

13. The flexible compactor of claim 11, wherein:
    the flexible joint includes a flexible material, and
    the reinforcing spine includes at least one ply of unidirectional fiber reinforced resin passing through the flexible joint.

14. The flexible compactor of claim 13, wherein the ply of unidirectional fiber reinforced resin has a width less than a width of the reinforcement strips.

15. The flexible compactor of claim 14, wherein the ply of unidirectional fiber reinforced resin has a fiber orientation substantially aligned with a length of the cap portion.

16. A flexible compactor for transporting and compacting a contoured composite stiffener layup having a cavity therein, comprising:
    a hat portion adapted to be placed within the cavity; and
    a cap portion coupled with the hat portion and flexible within a first plane, the cap portion including at least one flexible joint, the cap portion further including a reinforcing spine for reinforcing the flexible joint, wherein the reinforcing spine includes unidirectional fiber reinforced resin and extends through the flexible joint.

17. The flexible compactor of claim 16, wherein:

the flexible joint is located within the cap portion and allows the cap portion to flex along at least a first plane.

18. The flexible compactor of claim 17, wherein:

the cap portion has a thickness; and the flexible joint extends substantially throughout the entire thickness of the cap portion.

19. The flexible compactor of claim 17, wherein:

the flexible joint includes a flexible rubber; and the reinforcing spine extends through the flexible rubber.

20. The flexible compactor of claim 17, wherein the reinforcing spine is aligned with and located near a neutral axis of the combination of the cap portion and the hat portion.

\* \* \* \* \*